(12) United States Patent  
Kanemasu et al.

(10) Patent No.: US 8,557,167 B2
(45) Date of Patent: Oct. 15, 2013

(54) COMPOSITE MATERIAL MANUFACTURING DEVICE AND COMPOSITE MATERIAL MANUFACTURING METHOD

(75) Inventors: Masayuki Kanemasu, Aichi (JP); Shigeru Nishiyama, Aichi (JP); Hideki Horizono, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/122,571

(22) PCT Filed: Nov. 18, 2009

(86) PCT No.: PCT/JP2009/069585
§ 371 (c)(1),
(2), (4) Date: Apr. 5, 2011

(87) PCT Pub. No.: WO2010/058802
PCT Pub. Date: May 27, 2010

(65) Prior Publication Data
US 2011/0204534 A1    Aug. 25, 2011

(30) Foreign Application Priority Data

Nov. 18, 2008  (JP) .................................. 2008-294417

(51) Int. Cl.
*B28B 3/00* (2006.01)
(52) U.S. Cl.
USPC ........................................................ 264/333
(58) Field of Classification Search
USPC ........................................................ 264/333
See application file for complete search history.

(56) References Cited

U.S. PATENT DOCUMENTS 6,506,325 B1 *  1/2003 Cartwright ................... 264/40.6

FOREIGN PATENT DOCUMENTS

| CA | 2 362 871 | 8/2000 |
|---|---|---|
| EP | 1 721 719 | 11/2006 |
| JP | 5-237853 | 9/1993 |
| JP | 7-137154 | 5/1995 |
| JP | 9-117964 | 5/1997 |
| JP | 2000-238139 | 9/2000 |
| JP | 2002-234078 | * 8/2002 |

(Continued)

OTHER PUBLICATIONS

Decision on Patent Grant issued Nov. 21, 2012 in corresponding Russian Application No. 2011119797, with English translation thereof.
Shvarts, O. et al., "Plastics Processing", Professiya Publishers, 2005, pp. 207-214, with English translation thereof.
Canadian Notice of Allowance dated Dec. 24, 2012 in Application No. 2,739,517.

(Continued)

*Primary Examiner* — Larry Thrower
(74) *Attorney, Agent, or Firm* — Wenderoth, Lind & Ponack, L.L.P.

(57) ABSTRACT

In manufacturing composite material by curing fluid, strength deterioration of the composite material due to repair before the fluid is cured is reduced. A suction hole is formed in a bag film (3) for sealing a space for fibers being impregnated with resin, after start of impregnation. The suction hole is covered by a plate (56) with holes (57). The resin is sucked from the space through the plate (56). According to such composite material manufacturing method, a defect, which occurs during fibers are impregnated with resin, can be repaired before the resin is cured without causing disorder and damage in the fibers. In a composite material formed from one repaired in the above way, the repaired portion is strong, namely, there is no strength deterioration due to repair after curing, and thus, the material is preferred as compared with a composite material which is repaired after resin is cured.

14 Claims, 7 Drawing Sheets

(56) References Cited

FOREIGN PATENT DOCUMENTS

| | | |
|---|---|---|
| JP | 2003-39455 | 2/2003 |
| JP | 2004-203021 | 7/2004 |
| JP | 2005-271247 | 10/2005 |
| JP | 2006-187897 | 7/2006 |

OTHER PUBLICATIONS

International Search Report issued Mar. 2, 2010 in International (PCT) Application No. PCT/JP2009/069585.
Decision to Grant a Patent, with English translation, issued Aug. 26, 2013 in related Japanese Patent Application No. 2010-539243.

* cited by examiner

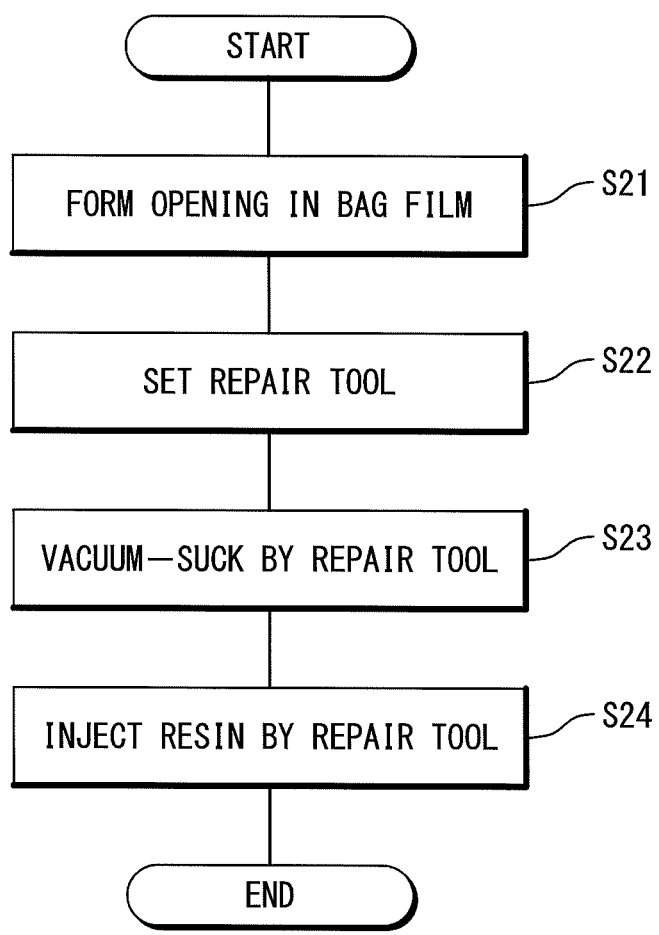

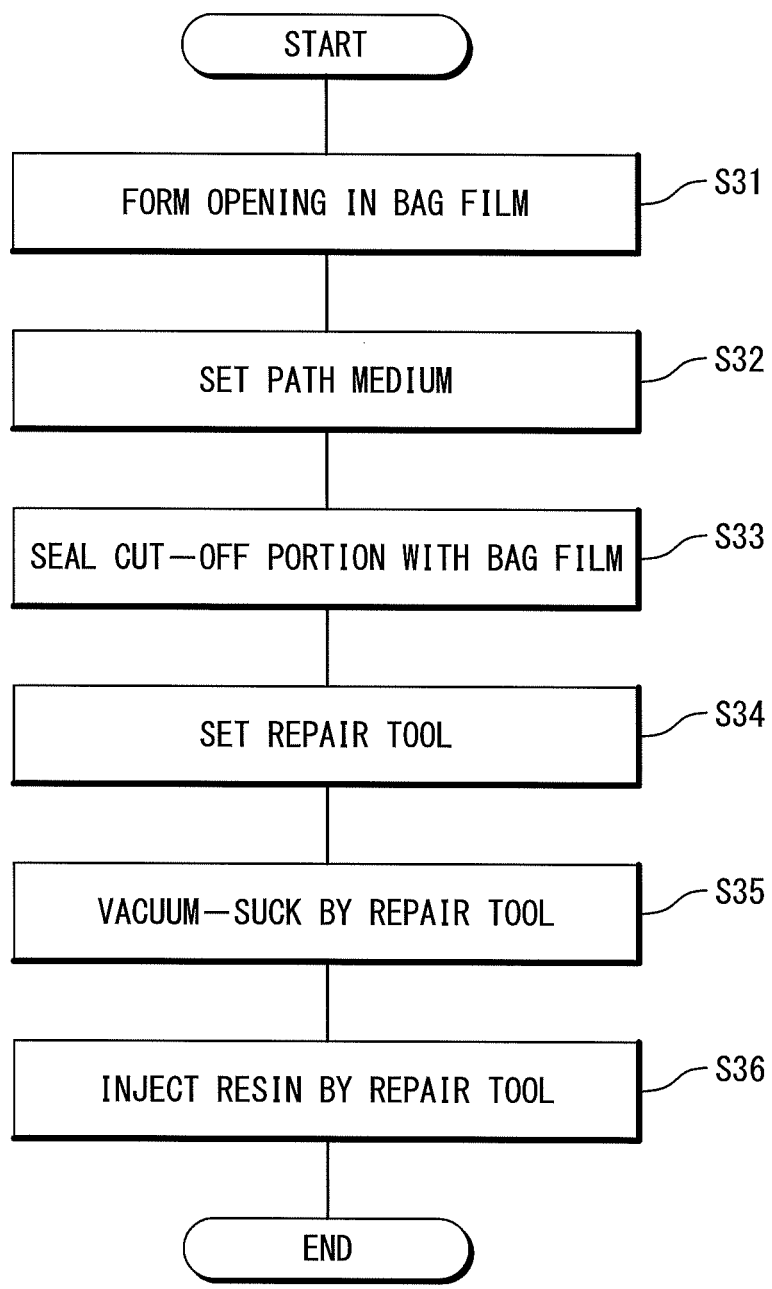

COMPOSITE MATERIAL MANUFACTURING DEVICE AND COMPOSITE MATERIAL MANUFACTURING METHOD

TECHNICAL FIELD

The present invention relates to a composite material manufacturing device and a composite material manufacturing method, and in particular, relates to a composite material manufacturing device and a composite material manufacturing method which are used for manufacturing fiber reinforced composite material.

BACKGROUND ART

Fiber reinforced composite material is known which is reinforced with fibers impregnated with resin. The fiber reinforced composite material is exemplified by CFRP (Carbon Fiber Reinforced Plastics). Since there is great merit in weight saving, such fiber reinforced composite material is applied to products such as aircraft structural members. As a molding method of the fiber reinforced composite material, there is a VaRTM (Vacuum assisted Resin Transfer Molding) in which laminated reinforcement fibers are impregnated with resin in a vacuum and the resin is cured. In a fiber reinforced composite material manufactured by the VaRTM, inherent defects such as a void and impregnation failure of resin may occur. In general, when the defect in the fiber reinforced composite material is repaired after curing, the strength of the repaired portion is reduced since reinforcement fibers are processed. A composite material manufacturing method is desired in which a repair is performed without reducing strength of a fiber reinforced composite material.

Japanese Patent Publication (JP-A-Heisei 07-137154) (conventional example 1) discloses a resin composite repair method with extremely-high repairing effect, capable of filling of resin by performing no or minimum additional process to a product. With respect to the resin injection repair method for resin composite, in a repair method in which resin is injected into a defect portion of a resin composite having a defect consisting of a void with an opening portion, a connection jig including a communicating tube with a valve is attached via a sealant to a surface of the resin composite such that the communicating tube communicates with the opening portion in a airtight state, the communicating tube is connected to a pressure reducing device to reduce pressure in the void of the defect portion, and then resin is injected from the communicating tube.

Japanese Patent Publication (JP-P2003-39455A) (conventional example 2) discloses an RTM method which can easily mold an FRP structure having a complicated shape or a high-quality FRP structure with no portion of impregnation failure. In the RTM method, in which reinforcement base material is placed in a molding die having injection ports and depressurization ports, the upper surface of the molding die is covered and sealed up with an upper die or bag material, and then resin is injected from the injection ports while sucking air from the depressurization ports, when an impregnation failure portion is likely to remain in a molding product during the molding, the impregnation failure portion is filled up with resin by switching at least part of the depressurization ports to injection ports to inject resin before the completion of resin injection.

Japanese Patent Publication (JP-P2004-203021A) (conventional example 3) discloses a resin impregnation sensor/repair device which can easily detect (monitor) degree of resin impregnation and can repair an impregnation failure defect before resin is cured. The resin impregnation sensor/repair device has a tube which penetrates a bag film for covering fiber base material to be impregnated with liquid resin in a vacuum and to be put into the fiber base material, and a transparent airtight vessel in communication with a base end of the tube.

Japanese Patent Publication (JP-P2005-271247A) (conventional example 4) discloses an FRP reinforce/repair method which can perform reinforce/repair operations while restoring shapes and functions before repair, and guarantee quality by improving strength properties such as bonding strength and stability of the strength properties while maintaining an advantage that degree of freedom of a place of the operations is high. The FRP reinforce/repair method is characterized in that the FRP reinforce/repair method at least includes the following steps of (A) to (E): (A) a bonding layer covering step for covering with a bonding layer, an outer surface of a defect portion for which reinforcement and repair of FRP are desired; (B) a preform setting step for placing a preform, which at least includes reinforcement fiber base material, on the bonding layer; (C) a sealing step for connecting a depressurization suction port and a resin injection port to the preform and covering at least portions of the bonding layer and the preform with a bag material; (D) a resin impregnating step for depressurizing a cavity formed in the bag material and injecting resin from the resin injection port to impregnate the preform with resin; and (E) a curing step for curing the injected resin.

Japanese Patent Publication (JP-P2006-187897A) (conventional example 5) discloses a defect repair method for composite, which can prevent deterioration of after-repair quality and strength of a resin composite product by securely filling a void defect portion formed in the resin composite product with resin and can deal with various defect situations. The defect repair method for composite is a defect repair method for filling with resin, a void defect portion which has an opening portion and is formed in a resin composite product. The defect repair method for composite includes: a covering and sealing step for covering a surrounding region of the opening portion with a flexible covering material such that a specific space surrounded by the resin composite product and the covering material become airtight state; a vacuum step for discharging air from the specific space to cause pressure in the specific space to be a predetermined vacuum pressure; a resin accumulation process for providing a resin reservoir outside the covering material to accumulate liquid resin in the resin reservoir such that the liquid resin is adjacent to the opening portion across the covering material; a resin flowing step for making a resin inflow hole in a portion of the covering material, which is adjacent to the opening portion, and causing the liquid resin accumulated in the resin reservoir to flow into the void defect portion through the resin inflow hole and the opening portion due to the vacuum pressure inside the specific space; and a resin curing step for curing the resin which has flowed into the void defect portion.

CITATION LIST

Patent Literature

Patent Document 1: Japanese Patent Publication (JP-A-Heisei 07-137154)
Patent Document 2: Japanese Patent Publication (JP-P2003-39455A)
Patent Document 3: Japanese Patent Publication (JP-P2004-203021A)

Patent Document 4: Japanese Patent Publication (JP-P2005-271247A)

Patent Document 5: Japanese Patent Publication (JP-P2006-187897A)

SUMMARY OF INVENTION

An object of the present invention is, in manufacturing a composite material by curing resin, to provide a composite material manufacturing device and a composite material manufacturing method that reduce deterioration of strength of the composite material.

Another object of the present invention is, in manufacturing a composite material by curing resin, to provide a composite material manufacturing device and a composite material manufacturing method that more securely repair the composite material before the resin is cured while reducing deterioration of strength of the composite material due to the repair.

Still another object of the present invention is, in manufacturing a composite material by curing resin, to provide a composite material manufacturing device and a composite material manufacturing method that more securely repair the composite material at lower cost before the resin is cured while reducing deterioration of strength of the composite material due to the repair.

A composite material manufacturing method according to the present invention includes: a step for forming a suction hole in a bag film for sealing a space in which fibers are impregnated with resin, after a start of impregnation with the resin; a step for covering the suction hole with a plate in which a plurality of holes are formed; and a step for sucking the resin through the plate from the space. According to the composite material manufacturing method, it is possible to repair a defect which occurs when fibers are impregnated with resin, without causing disorder and damage in the fibers and before the resin is cured. In a composite material formed from one repaired in the above way, the strength of the repaired portion is higher, namely, there is no strength deterioration due to repair after curing, and thus, the material is preferred as compared with a composite material which is repaired after resin is cured.

The composite material manufacturing method according to the present invention further includes: a step for forming an injection hole in the bag film; and a step for injecting the resin into the space through the injection hole during the resin is sucked through the suction hole. According to the composite material manufacturing method, the defect portion can be more securely impregnated with resin.

The composite material manufacturing method according to the present invention further includes: a step for sucking the resin through a suction port other than the suction hole; and a step for injecting the resin through an injection port other than the injection hole. It is preferred that the resin is sucked through the suction hole and the resin is injected into the space through the injection hole during the resin is sucked through the suction port and the resin is injected into the space through the injection port.

The composite material manufacturing method according to the present invention further includes a step for detecting a position in the space, at which a defect occurs, during the resin is sucked through the suction port and the resin is injected into the space through the injection port.

The composite material manufacturing method according to the present invention further includes a step for closing a hole formed in the bag film in the vicinity of the position. The step for sucking the resin through the plate is preferred to be performed after the hole is closed.

The composite material manufacturing method according to the present invention further includes: a step for forming a large hole in another bag film for sealing the space; and a step for sealing the large hole with a bag film after arranging a path medium in the space through the large hole. At this time, the injection hole is preferred to be formed in the vicinity of the path medium.

A composite material manufacturing device according to the present invention includes: a suction tool set to a suction hole formed in a bag film for sealing a space in which fibers are impregnated with resin; and a resin suction device connected to the suction tool through a suction tube. The suction tool includes: a suction tool main portion in which a suction cavity is formed to be connected to inside of the suction tube; and a suction porous portion in which a plurality of holes are formed to connect the cavity and the space. The resin suction device sucks the resin through the suction porous portion. The composite material manufacturing device can suck the resin impregnated into the fibers without causing disorder and damage in the fibers. As a result, the composite material manufacturing device can repair a defect which occurs during the fibers are impregnated with resin before the resin is cured. In a composite material formed from one repaired in the above way, the strength of the repaired portion is higher, namely, there is no strength deterioration due to repair after curing, and thus, the material is preferred as compared with a composite material which is repaired after resin is cured.

The composite material repair device according to the present invention includes: an injection tool set to an injection hole formed in the bag film; and a resin injection device connected to the injection tool though an injection tube. The injection tool includes: an injection tool main portion in which an injection cavity is formed to be connected to inside of the injection tube; and an injection porous portion in which a plurality of holes are formed to connect the injection cavity and the space. The resin injection device injects the resin into the space through the injection porous portion. When a defect, which occurs during fibers are impregnated with resin, is repaired before the resin is cured, the composite material manufacturing device can securely cause the defect portion to be impregnated with resin.

The suction tool can be used as the injection tool. At this time, the injection tool and the suction tool can be manufactured at lower cost.

A tool according to the present invention includes: a main portion in which a cavity is formed; a joint portion connected to a tube to connect the cavity to inside of the tube; and a porous portion. When the tool is set to a bag film for sealing a space in which fibers are impregnated with resin, the porous portion is arranged between the cavity and the space. In the porous portion, there are formed a plurality of holes connecting the cavity and the space to each other. According to the tool, it is possible to repair a defect which occurs when fibers are impregnated with resin, without causing disorder and damage in the fibers and before the resin is cured. In a composite material formed from one repaired in the above way, the strength of the repaired portion is higher, namely, there is no strength deterioration due to repair after curing, and thus, the material is preferred as compared with a composite material which is repaired after resin is cured.

When composite material is manufactured by curing resin, the composite material manufacturing device and the composite material manufacturing method according to the present invention can repair the composite material without strength deterioration before the resin is cured.

BRIEF DESCRIPTION OF DRAWINGS

FIG. 9 is a flow chart showing a composite material manufacturing method for a case that an impregnation failure portion is detected; and FIG. 10 is a flow chart showing a composite material manufacturing method for a case that a relatively-large impregnation failure portion is detected.

DESCRIPTION OF EMBODIMENTS

Figure 1:
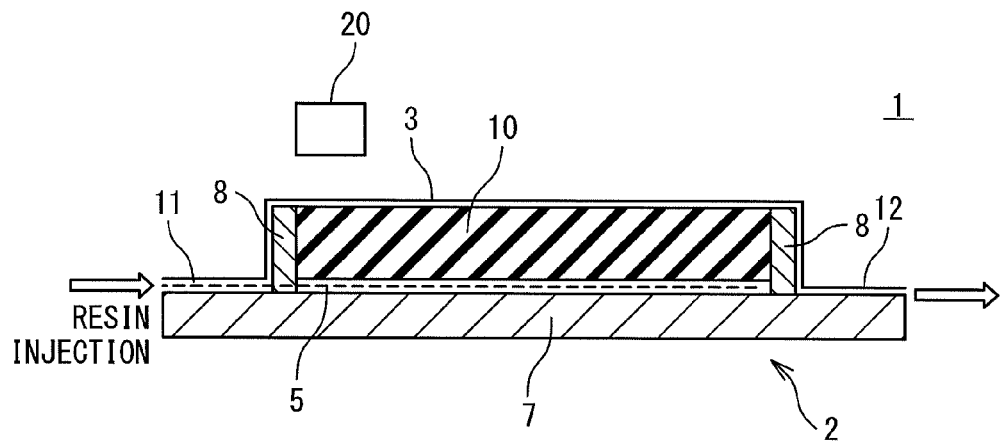
FIG. 1 is a sectional view showing a composite material forming tool.

With reference to the attached drawings, a composite material manufacturing device according to the present invention will be described. FIG. 1 is a sectional view showing a configuration of a composite material manufacturing device according to an embodiment of the present invention. The composite material manufacturing device 1 according to the embodiment includes a composite material forming tool having a mold 2 and an injection-side path medium 5. As shown in FIG. 1, the mold 2 has a plate portion 7 and lateral portions 8. The plate portion 7 is made of metal, composite material, or resin, in the shape of a plate such that a composite material to be formed has a desired shape. The plate portion 7 defines a bottom portion of the mold 2. The lateral portions 8 are attached onto the plate portion 7. Thus, the lateral portions 8 define lateral portions of the mold 2. Although not shown in the figure, the lateral portions 8 are formed at four sides on the plate portion 7 to form an impregnation space having an opening on the upper side. The shapes of the lateral portions 8 on the plate portion 7 determine a rough planar shape of the composite material to be manufactured. Additionally, changes in heights of the lateral portions 8 determine a rough shape of the composite material in a direction of height. Fiber reinforcement 10 to be impregnated is placed in the impregnation space. After that, the mold 2 is sealed up with a bag film 3.

The mold 2 is further provided with an injection port 11 and a suction port 12. The injection port 11 penetrates the lateral portion 8 to connect a resin injection device (not shown) and the impregnation space of the mold 2. The resin injection device injects resin into the impregnation space through the injection port 11. The suction port 12 connects a resin suction device (not shown), and the impregnation space. The resin suction device performs vacuum evacuation of the sealed impregnation space through the suction port 12, and sucks the injected resin from the impregnation space to the outside.

It is also possible that the mold 2 is configured not to use the lateral portions 8. In this case, an impregnation space is an internal space which is sealed up by the plate portion 7 and the bag film 3, and in which the fiber reinforcement 10 to be impregnated is placed. The injection port 11 connects the impregnation space and the resin injection device (not shown), and the suction port 12 connects the impregnation space and the resin suction device (not shown).

Alternatively, the lateral portions 8 may be made of flexible material or material of undefined shape. For example, rubber, wax, plastic material, and sealant are available.

The injection-side path medium 5 is formed in the form of a net at the bottom of the impregnation space, and assists resin to be injected evenly from the resin injection device into the impregnation space through the injection port 11. In this example, the path medium 5 may be provided not at the bottom of the impregnation space but at the upper portion. In that case, it is preferable that the injection port 11 is also positioned at the upper portion and connected to the path medium 5.

The fiber reinforcement 10 includes a fiber portion. In the fiber portion, woven fabrics made of carbon fiber are laminated. Note that the fiber portion may also be made of another fiber other than carbon fiber, such as glass fiber and aramid fiber.

Figure 2:
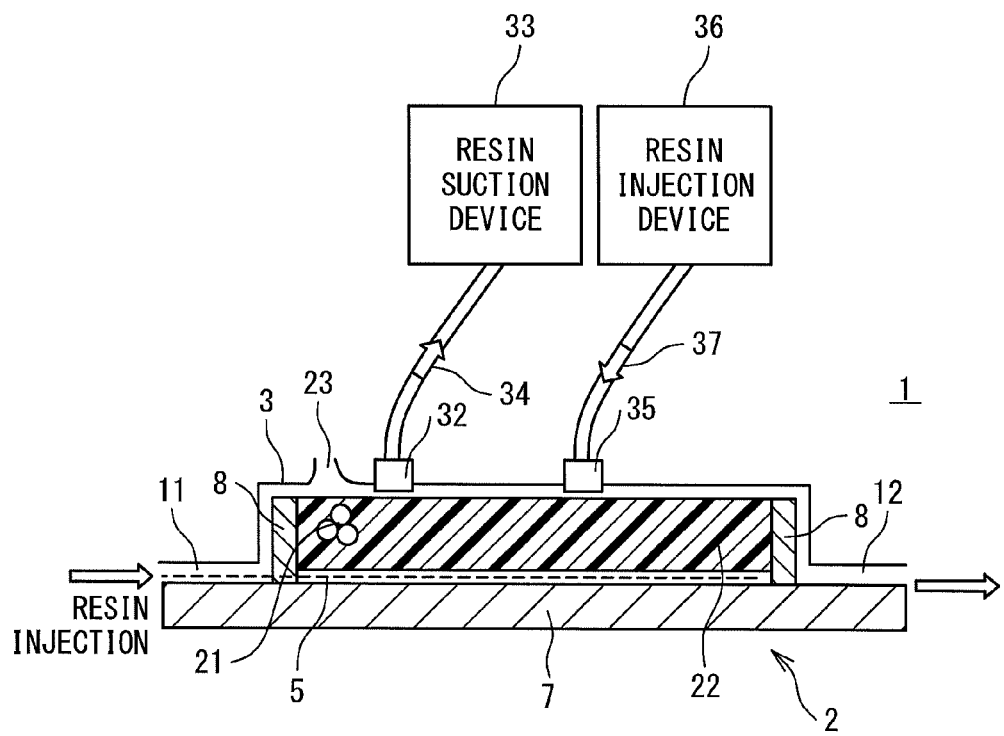
FIG. 2 is a block diagram showing a composite material manufacturing device which is set to the composite material forming tool when a void is detected.

As shown in FIG. 2, a void 21 can be formed in a fiber reinforced resin intermediate material 22 to be manufactured, when the fiber reinforcement 10 is impregnated with resin. The void 21 includes minute gas bubbles. The void 21 tends to be formed when a volatile component is included in injected resin or when a leak hole 23 is formed in the bag film 3.

Figure 3:
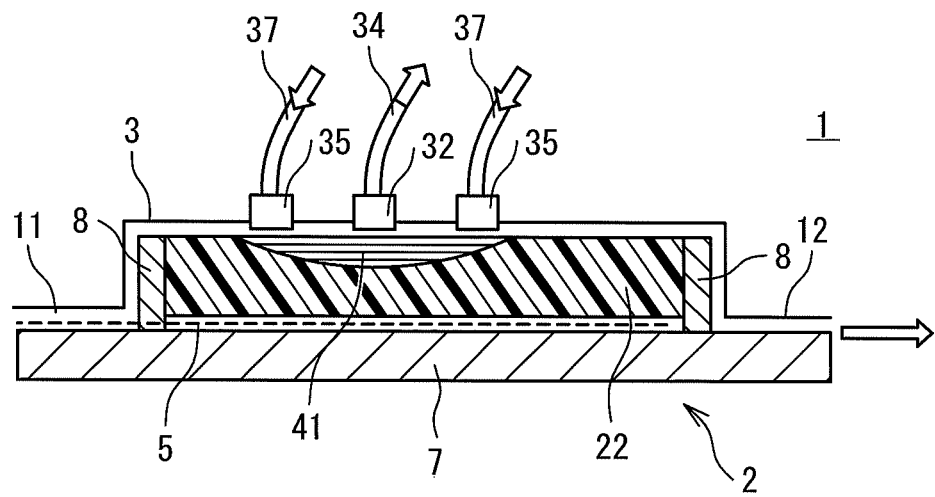
FIG. 3 is a block diagram showing a composite material manufacturing device which is set to the composite material forming tool when an impregnation failure portion is detected.

Additionally, an impregnation failure defect can be formed in the fiber reinforced resin intermediate material 22 at the resin impregnation. The impregnation failure defect is a portion in which carbon fiber is bared due to insufficient resin impregnation. FIG. 3 shows the fiber reinforced resin intermediate material 22 in which the impregnation failure portion 41 is formed.

Figure 4:
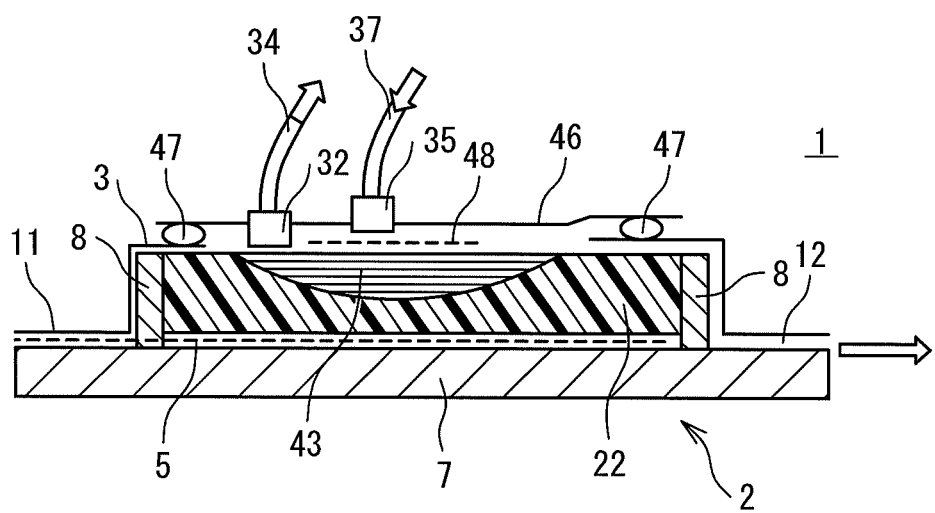
FIG. 4 is a block diagram showing a composite material manufacturing device which is set to the composite material forming tool when a relatively-large impregnation failure portion is detected.

Furthermore, a relatively-large impregnation failure defect can be formed in the fiber reinforced resin intermediate material 22. FIG. 4 shows the fiber reinforced resin intermediate material 44 in which the relatively-large impregnation failure portion 43 is formed. The impregnation failure portion 43 is formed in the fiber reinforced resin intermediate material 22 in the vicinity of the bag film 3.

As shown in FIG. 1, the composite material manufacturing device 1 further includes an inspection device 20 for inspecting the presence of void or impregnation failure defect. The inspection device 20, for example, is an imaging device and takes an image of the impregnation space from above to detect a void or a defect based on the image when the bag film 3 is transparent. Additionally, it is preferable that the inspection device 20 should be able to recognize plane position coordinates of the impregnation space and report a position of a void or the like. When the impregnation space is large, the inspection device 20 may be moved on plane coordinates and detect position coordinates in conjunction with the movement. Additionally, the inspection device 20 may be a nondestructive inspection device such as an ultrasonic test device. According to this, it is possible to detect not only a defect on the surface but also a void or the like at the inside. It is preferable that the inspection device 20 should be able to operate not only after completion of impregnation but also during impregnation process.

Processes will be described for a case when the void 21 is detected as shown in FIG. 2.

The composite material manufacturing device 1 includes a suction tool 32, a resin suction device 33, a suction tube 34, an injection tool 35, a resin injection device 36, and an injection tube 37. After resin impregnation is started, for example during the resin impregnation, an opening is formed in the bag film 3 and the suction tool 32 is attached to the opening. The resin suction device 33 is connected to the suction tool 32 through the suction tube 34. After resin impregnation is started, for example during the resin impregnation, an opening is formed in the bag film 3 and the injection tool 35 is attached to the opening. The resin injection device 36 is connected to the injection tool 35 through the injection tube 37.

As shown in FIG. 2, when the void 21 is detected in the fiber reinforced resin intermediate material 22, the suction tool 32 is positioned on the bag film 3 in the vicinity of a position at which the void 21 is formed. When the void 21 is detected, the injection tool 35 is positioned on the bag film 3 in the vicinity of the position at which the void 21 is formed. The injection tool 35 is positioned such that a distance between the position of the void 21 and the injection tool 35 is longer than a distance between the position of the void 21 and the suction tool 32.

After the leak hole 23 of the bag film 3 is closed, the resin suction device 33 is operated by a user to perform evacuation of the impregnation space through the suction tool 32 and the suction tube 34, and suck resin from the impregnation space to the outside. The resin injection device 36 is operated by the user to inject resin into the impregnation space through the injection tool 35 and the injection tube 37. As a result, the void is filled up with resin. At this time, resin may be injected into the impregnation space through the injection port 11, and vacuum evacuation may be performed to the sealed impregnation space through the suction port 12. Alternatively, the injection of resin through the injection port 11 and the evacuation through the suction port 12 may be stopped or completed.

As shown in FIG. 3, there is a case that the inspection device 20 detects an impregnation failure defect in the fiber reinforcement 10, which is formed in resin impregnation. The impregnation failure defect is a portion in which carbon fiber is bared due to insufficient resin impregnation. When the impregnation failure portion 41 is detected in the fiber reinforced resin intermediate material 22, an opening is formed in the bag film 3 at the position corresponding to a center of the region in which the impregnation failure portion 41 is formed, and the suction tool 32 is placed at the opening. When the impregnation failure portion 41 is detected in the fiber reinforced resin intermediate material 22, openings are formed in the bag film 3 at a plurality of positions corresponding to a periphery of the region in which the impregnation failure portion 41 is formed, and the injection tools 35 are placed at the openings. The resin suction device (not shown) connected to the suction tube 34 is operated by the user to evacuate the impregnation space and suck resin from the impregnation space to the outside through the suction tool 32 and the suction tube 34. The resin injection device (not shown) connected to the injection tubes 37 is operated by the user to inject resin into the impregnation space through the injection tools 35 and the injection tubes 37. As a result, the impregnation failure portion 41 is impregnated with resin. At this time, resin may be injected into the impregnation space through the injection port 11, and vacuum evacuation may be performed to the sealed impregnation space through the suction port 12. Alternatively, the injection of resin through the injection port 11 and the evacuation through the suction port 12 may be stopped or completed.

Furthermore, the inspection device 20 may detect formation of a relatively-large impregnation failure defect. FIG. 4 shows the fiber reinforced resin intermediate material 22 in which the relatively-large impregnation failure portion 43 is formed. The impregnation failure portion 43 is formed in the fiber reinforced resin intermediate material 22 in the vicinity of the bag film 3. At this time, the bag film 3 is cut away such that the large impregnation failure defect portion is exposed. As shown in FIG. 4, the composite material manufacturing device 1 further includes a bag film 46, a sealant 47, and a path medium 48. The bag film 46 covers a hole formed in the bag film 3 in the vicinity of the impregnation failure portion 43 correspondingly to the impregnation failure portion 43. The sealant 47 is positioned in the gap between the bag film 46 and the remaining bag film 3, and contacts tightly both of the bag film 46 and the bag film 3. The sealant 47 seals up the gap between the bag film 46 and the bag film 3 to prevent contaminant from entering inside of the mold 2. The path medium 48 is positioned at a side of the impregnation space from the bag film 46 and positioned in a region in which the impregnation failure portion 43 is formed.

The injection tool 35 is positioned on the bag film 46 at a center of the region in which the impregnation failure portion 43 is formed. The suction tool 32 is positioned on the bag film 46 at a periphery of the region in which the impregnation failure portion 43 is formed, i.e. positioned in a region in which the path medium 48 is arranged.

As mentioned above, the suction tool 32 is positioned at a place where resin impregnation is expected to occur at last. For this reason, the position of the suction tool 32 may vary depending on conditions of the defect.

The resin suction device 33 (not shown) is operated by the user to evacuate the impregnation space through the suction tool 32 and the suction tube 34 and suck resin from the impregnation space to the outside. The resin injection device 36 (not shown) is operated by the user to inject resin into the impregnation space through the injection tool 35 and the injection tube 37. As a result, the impregnation failure portion 43 is impregnated with resin. At this time, resin may be injected into the impregnation space through the injection port 11, and vacuum evacuation may be performed to the sealed impregnation space through the suction port 12. Alternatively, the injection of resin through the injection port 11 and the evacuation through the suction port 12 may be stopped or completed.

Figure 5:
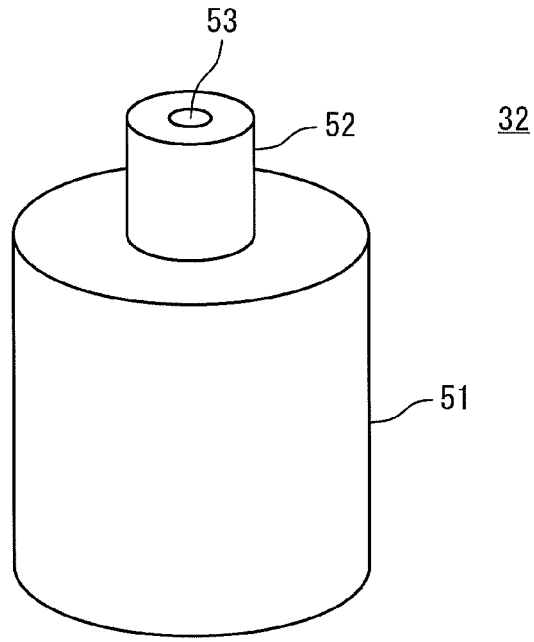
FIG. 5 is a perspective view showing a suction tool.

FIG. 5 shows the suction tool 32. The suction tool 32 includes a main portion 51 and a joint portion 52. The main portion 51 is made of aluminum and formed in the shape of a cylindrical shape. The joint portion 52 is made of aluminum and has a cylindrical shape of which diameter is smaller than that of the cylinder of the main portion 51. The joint portion 52 is joined to a bottom surface portion of the cylinder of the main portion 51 such that the joint portion 52 is integrated with the main portion 51. The suction tool 32 may be made of another metal such as stainless steel.

Figure 6:
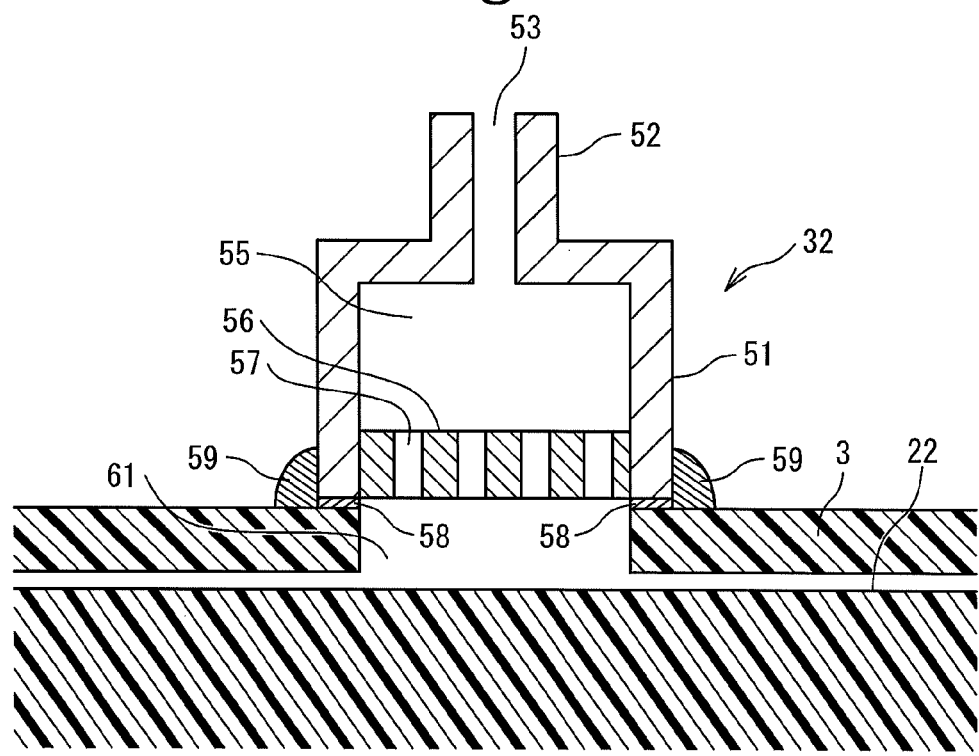
FIG. 6 is a sectional view showing the suction tool.

As shown in FIG. 6, a cavity 55 is formed inside the main portion 51. A flow path 53 is formed in the joint portion 52. The flow path 53 connects the outside to the cavity 55. The suction tool 32 further includes a porous plate portion 56. The porous plate portion 56, for which rigidity is necessary, is made of stainless steel, and a plurality of holes 57 are formed in the porous plate portion 56. That is to say, the porous plate portion 56 is made from perforated metal. The porous plate portion 56 is positioned at a bottom surface of the cylinder of the main portion 51, opposite to the bottom surface on which the joint portion 52 is formed. The holes 57 of the porous plate portion 56 connect the impregnation space to the cavity 55 at the time of use. Note that the porous plate portion 56 may be replaced by another plate with many holes. The other plate is a wire mesh, for example. It is also possible to use a blockshaped member having a plurality of holes for connecting the impregnation space to the cavity 55 at the time of use, instead of the porous plate portion.

The suction tool 32, when used, is bonded to the bag film 3 by applying a double-sided tape 58 to the bottom surface of the main portion 51, and sealant 59 is provided to the bottom of the main portion 51 for sealing up the bonding portion. The double-sided tape 58 bonds a surrounding portion of the suction tool 32, which surrounds the porous plate portion 56, to a surrounding portion surrounding a hole 61 formed in the bag film 3. The double-sided tape 58 can be replaced by another tool for bonding the surrounding portion surrounding the porous plate portion 56 and the surrounding portion surrounding the hole 61. The other tool is adhesive, for example. The sealant 59 tightly contacts both of the surrounding portion surrounding the porous plate portion 56 and the surrounding portion surrounding the hole 61. The sealant 59 seals up a gap between the suction tool 32 and the bag film 3 to prevent contaminant from entering inside of the mold 2 through the gap and the hole 61, and prevent vacuum leak.

The injection tool 35 is made in the same way as the suction tool 32. That is to say, the injection tool 35 includes a main portion and a joint portion. The main portion is made of aluminum and formed in a cylindrical shape. The joint portion is made of aluminum and formed in a cylindrical shape of which diameter is smaller than that of the cylinder of the main portion. The joint portion is joined to a bottom surface of the cylinder of the main portion such that the joint portion is integrated with the main portion. A cavity is formed inside of the main portion. A flow path is formed in the joint portion. The flow path connects the outside to the cavity. The injection tool 35 further includes a porous plate portion. The porous plate portion is made of stainless steel, and a plurality of holes are formed in the porous plate portion. The porous plate portion is positioned at a bottom surface of the cylinder of the main portion, opposite to the bottom surface on which the joint portion is formed. The holes of the porous plate portion connect the impregnation space to the cavity. The injection tool 35, when used, is bonded to the bag film by applying a double-sided tape to the bottom surface of the main portion, and sealant is provided to the bottom of the main portion for sealing up the bonding portion. The double-sided tape bonds a surrounding portion of the injection tool 35, which surrounds the porous plate portion, to a surrounding portion surrounding a hole formed in the bag film. That is to say, the double-sided tape can be replaced by another tool for bonding the surrounding portion surrounding the porous plate portion and the surrounding portion surrounding the hole. The other tool is adhesive, for example. The sealant tightly contacts both of the surrounding portion surrounding the porous plate portion and the surrounding portion surrounding the hole. The sealant seals up a gap between the injection tool 35 and the bag film 3 to prevent contaminant from entering inside the mold 2 from the gap through the hole 61, and prevent vacuum leak.

Since the injection tool 35 and the suction tool 32 have the same shape and the same function as mentioned above, one of the tools can be used as the other.

Figure 7:
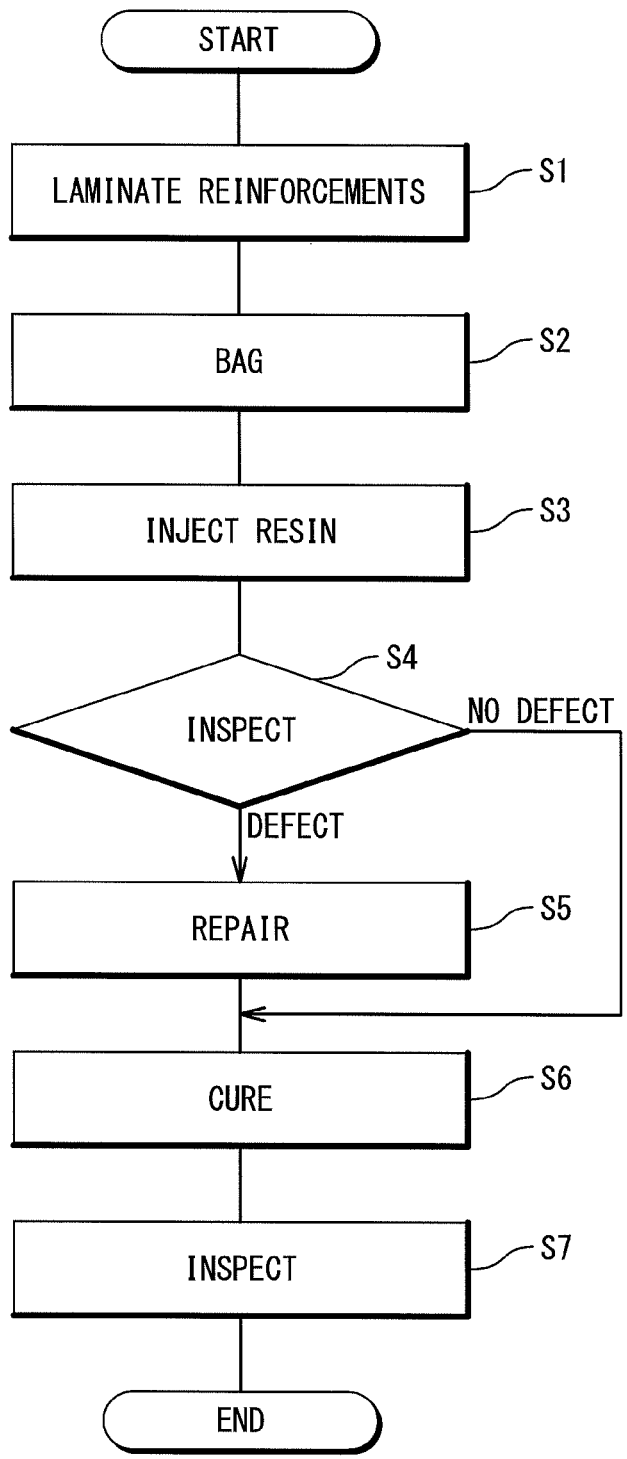
FIG. 7 is a flow chart showing a composite material manufacturing method.

A composite material manufacturing method according to the embodiment of the present invention is carried out by using the composite material manufacturing device 1. The user firstly laminates a plurality of sheets formed by carbon fiber, as shown in FIG. 7 (step S1). Next, the injection-side path medium 5 is positioned inside of the mold 2, and the plurality of sheets are positioned on the path medium 5. After that, the impregnation space of the mold 2 is sealed up from the outside by using the bag film 3 (step S2). Furthermore, the injection port 11 and the suction port 12 are formed, the injection port 11 is connected to the resin injection device, and the suction port 12 is connected to the resin suction device.

The composite material manufacturing device 1 is placed in an oven, while heating the composite material manufacturing device 1, the resin injection device is used to inject resin into the impregnation space of the mold 2 and the resin suction device is used to evacuate the impregnation space of the mold 2. After the resin reaches the suction port 12, the resin is discharged from the mold 2 to the outside by using the resin suction device (step S3). As a result of the injection of resin, the fiber reinforced resin intermediate material 22 is formed from the laminated sheets.

While injecting the resin into the impregnation space of the mold 2, the inspection device 20 is used to inspect the fiber reinforced resin intermediate material 22 whether or not a defect is present (step S4). When it is judged that a defect is present in the fiber reinforced resin intermediate material 22 (step S4, defect is found), the fiber reinforced resin intermediate material 22 is repaired (step S5).

When it is judged that no defect is present in the fiber reinforced resin intermediate material 22 (step S4, no defect is found), or after the fiber reinforced resin intermediate material 22 is repaired, the fiber reinforced resin intermediate material 22 is formed into fiber reinforced resin by curing the resin through heating it at higher temperature (step S6). The fiber reinforced rein is inspected whether a defect is present (step S7), and the fiber reinforced resin is completed when no defect is found in the fiber reinforced resin.

Figure 8:
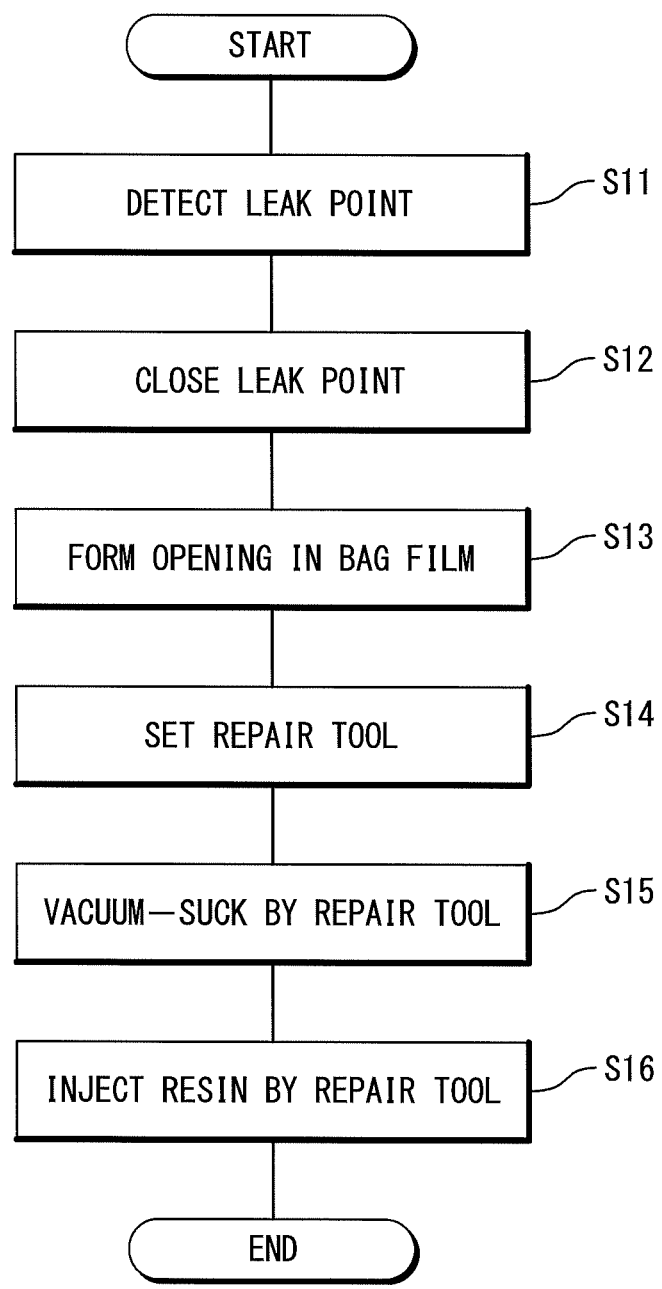
FIG. 8 is a flow chart showing a composite material manufacturing method for a case that a void is detected.

FIG. 8 shows a method carried out in the step S5 when the void 21 is found in the step S4 of the composite material manufacturing method in FIG. 7. The method is carried out by using the composite material manufacturing device 1, and carried out in parallel (simultaneously) with the step S3 of the composite material manufacturing method in FIG. 7. First, the bag film 3 is inspected to detect a leak point (hole 23) which has caused the void (step S11), and the detected hole 23 is closed (step S12).

Next, a suction hole is formed at a position of the bag film 3, at which the void 21 is formed (step S13). The diameter of the suction hole is slightly smaller than the diameter of the bottom surface of the suction tool 32. The double-sided tape 58 is used to bond the surrounding portion of the suction tool 32, which surrounds the porous plate portion 56, to the surrounding portion which surrounds the suction hole formed in the bag film 3. Next, the sealant 59 is used to seal the gap between the suction tool 32 and the bag film 3 to prevent contaminant from entering inside of the mold 2 from the gap. Furthermore, the suction tube 34 is used to connect the suction tool 32 and the resin suction device 33 (step S14).

The injection tool 35 is set to the bag film 3, in the same way as the suction tool 32. That is to say, an injection hole is formed in the bag film 3 at a position corresponding to and in the vicinity of a position at which the void 21 is formed. At this time, the injection hole is formed such that a distance between the position of the void 21 and the injection hole is longer than a distance between the position of the void 21 and the suction hole. The diameter of the injection hole is slightly smaller than the diameter of the bottom surface of the injection tool 35. The double-sided tape is used to bond the surrounding portion of the injection tool 35, which surrounds the porous plate portion, to the surrounding portion which surrounds the injection hole formed in the bag film 3. Next, the sealant is used to seal the gap between the injection tool 35 and the bag film 3 to prevent contaminant from entering inside of the mold 2 from the gap. Furthermore, the injection tube 37 is used to connect the injection tool 35 and the resin injection device 36.

The resin suction device 33 is used to evacuate the inside of the mold 2 through the suction tool 32, and suck the resin from the impregnation space of the mold 2 through the suction tool 32 (step S15). The resin injection device 36 is used to inject resin into the impregnation space of the mold 2 through the injection tool 35 (step S16). After resin is sucked through the suction tool 32 from the fiber reinforced resin intermediate material 22 in which the void 21 is formed to the outside, the injection of resin through the injection tool 35 is stopped and the suction of resin through the suction tool 32 is stopped.

According to the composite material manufacturing method, it is possible to repair a void which occurs in the fiber reinforced resin intermediate material 22 when fibers are impregnated with resin, without causing disorder and damage in the fiber portion and before the resin is cured. A composite material formed from the material repaired in the above way is preferred as compared with a composite material which is repaired after the resin is cured, since the strength of the repaired portion is higher in the composite material formed from the material repaired in the above way.

Note that the composite material manufacturing method can be carried out without setting the injection tool 35 to the bag film 3 when a region in which a void is formed is small enough. At this time, a region from which resin is sucked through the suction tool 32 is filled with resin positioned in the surroundings, and a shortage of resin is compensated by injection of resin into the inside of the mold 2 through the injection port 11. Such composite material manufacturing method can, as same in the case that the composite material manufacturing method is carried out while injecting resin into the inside of the mold 2 through the injection tool 35, repair the fiber reinforced resin intermediate material 22 without causing disorder and damage in the fiber portion and reduce deterioration of the strength of a repaired portion of a composite material formed from the repaired fiber reinforcement 10.

FIG. 9 shows a composite material manufacturing method carried out in the step S5 when the impregnation failure portion 41 is found in the step S4 of the composite material manufacturing method in FIG. 7. The composite material manufacturing method is carried out by using the composite material manufacturing device 1 while the step S3 of the composite material manufacturing method in FIG. 7 is carried out. A suction hole is formed at the center of the region of the bag film 3, in which the impregnation failure portion 41 is formed (step S21). The diameter of the suction hole is slightly smaller than the diameter of the bottom surface of the suction tool 32. The double-sided tapes 58 is used to bond the surrounding portion of the suction tool 32 surrounding the porous plate portion 56 to the surrounding portion surrounding the suction hole formed in the bag film 3. Next, the sealant 59 is used to seal the gap between the suction tool 32 and the bag film 3 to prevent contaminant from entering inside of the mold 2 from the gap. Furthermore, as shown in FIG. 3, the suction tube 34 is used to connect the suction tool 32 and the resin suction device 33 (not shown) (step S22).

In the same way as the suction tool 32, the injection tool 35 is set to the bag film 3. That is to say, an injection hole is formed at a periphery of the region of the bag film 3, in which the impregnation failure portion 41 is formed. The diameter of the injection hole is slightly smaller than the diameter of the bottom surface of the injection tool 35. The double-sided tapes is used to bond the surrounding portion of the injection tool 35 surrounding the porous plate portion to the surrounding portion surrounding the injection hole formed in the bag film 3. Next, the sealant is used to seal the gap between the injection tool 35 and the bag film 3 to prevent contaminant from entering inside of the mold 2 from the gap. Furthermore, the injection tube 37 is used to connect the injection tool 35 and the resin injection device 36 (not shown). When the impregnation failure portion 41 is large, it is also possible to set a plurality of injection tools 35 to the bag film 3.

The resin suction device 33 is used to evacuate the impregnation space of the mold 2 through the suction tool 32 and suck resin from the impregnation space of the mold 2 through the suction tool 32 (step S23). The resin injection device 36 is used to inject resin into the inside of the mold 2 through the injection tool 35 (step S24). After resin in which the impregnation failure portion 41 is formed is sucked from the mold 2 to the outside of through the suction tool 32, the injection of resin through the injection tool 35 is stopped and the suction of resin through the suction tool 32 is stopped.

According to the composite material manufacturing method, it is possible to repair an impregnation failure portion which occurs in the fiber reinforced resin intermediate material 22 when fibers are impregnated with resin, without causing disorder and damage in the fiber portion and before the resin is cured. A composite material formed from the material repaired in the above way is preferred as compared with a composite material which is repaired after the resin is cured, since the strength of the repaired portion is higher in the composite material formed from the material repaired in the above way.

Note that the composite material manufacturing method can be carried out without setting the injection tool 35 to the bag film 3 when a region in which an impregnation failure occurs is small enough. At this time, a region from which resin is sucked through the suction tool 32 is filled with resin positioned in the surroundings, and a shortage of resin is compensated by resin injected into the inside of the mold 2 through the injection port 11. Such composite material manufacturing method can, as same in the case that the composite material manufacturing method is carried out while injecting resin into the inside of the mold 2 through the injection tool 35, repair the fiber reinforcement 10 without causing disorder and damage in the fiber portion and reduce deterioration of the strength of a repaired portion of a composite material formed from the repaired fiber reinforced resin intermediate material 22.

FIG. 10 shows a composite material manufacturing method carried out in the step S5 when a relatively large impregnation failure portion 43 is found in the step S4 of the composite material manufacturing method in FIG. 7. The composite material manufacturing method is carried out by using the composite material manufacturing device 1 while the step S3 of the composite material manufacturing method in FIG. 7 is carried out. First, a hole is formed in the bag film 3 such that the impregnation failure portion 43 is exposed (step S31). The path medium 48 is set through the formed hole such that the path medium 48 is positioned in a region in which the impregnation failure portion 43 is formed (step S32). The hole formed in the bag film 3 is covered by the bag film 46, and the sealant 47 is used to contact tightly the bag film 46 and the bag film 3 to each other and seal up the gap between the bag film 46 and the bag film 3 (step S33).

An injection hole is formed at the center of the region of the bag film 46, in which the impregnation failure portion 43 is formed. The diameter of the injection hole is slightly smaller than the diameter of the bottom surface of the injection tool 35. The double-sided tape 58 is used to bond the surrounding portion of the injection tool 35 surrounding the porous plate portion 56 to the surrounding portion surrounding the suction hole formed in the bag film 46. Next, the sealant 59 is used to seal the gap between the injection tool 35 and the bag film 46 to prevent contaminant from entering inside of the mold 2 from the gap. Furthermore, as shown in FIG. 4, the injection tube 37 is used to connect the injection tool 35 and the resin injection device 36 (not shown) (step S34).

Additionally, the suction tool 32 is set to the bag film 46, in the same way as the injection tool 35. That is to say, a suction hole is formed at a position in the bag film 46, in which the path medium 48 is located. The diameter of the suction hole is slightly smaller than the diameter of the bottom surface of the suction tool 32. The double-sided tape is used to bond the surrounding portion of the suction tool 32 surrounding the porous plate portion 56 to the surrounding portion surrounding the suction hole formed in the bag film 46. Next, the sealant is used to seal the gap between the suction tool 32 and the bag film 46 to prevent contaminant from entering inside of the mold 2 from the gap. Furthermore, the suction tube 34 is used to connect the suction tool 32 and the resin suction device 33 (not shown).

The resin suction device 33 is used to evacuate the impregnation space of the mold 2 through the suction tool 32 and suck resin from the impregnation space of the mold 2 through the suction tool 32 (step S35). The resin injection device 36 is used to inject resin into the inside of the mold 2 through the injection tool 35 (step S36). After resin in which the impregnation failure portion 43 is formed is sucked from the mold 2 to the outside through the suction tool 32, the injection of resin through the injection tool 35 is stopped and the suction of resin through the suction tool 32 is stopped.

According to the composite material manufacturing method, it is possible to repair the relatively-large impregnation failure portion 43 which occurs in the fiber reinforced resin intermediate material 22 when fibers are impregnated with resin, without causing disorder and damage in the fiber portion and before the resin is cured. A composite material formed from the material repaired in the above way is preferred as compared with a composite material which is repaired after the resin is cured, since the strength of the repaired portion is higher in the composite material formed from the material repaired in the above way.

Note that the above-mentioned composite material manufacturing method can be carried out as a repair method, after injection of resin into the impregnation space through the injection port 11 is completed. At this time, a region from which resin is sucked through the suction tool 32 is filled with resin positioned in the surroundings, and a shortage of resin is compensated by injection of resin into the impregnation space through the injection tool 35. Furthermore, an injection tool 35 can be newly added when resin is insufficient. The composite material repair method may be carried out simultaneously with the time when the composite material manufacturing method is carried out while injecting resin into the impregnation space of the mold 2 through the injection port 11. The composite material repair method can, as same as the manufacturing method, repair the fiber reinforcement 10 without causing disorder and damage in the fiber portion, and can reduce deterioration of the strength of a repaired portion of a composite material formed from the repaired fiber reinforcement 10.

The invention claimed is:

1. A composite material manufacturing method comprising:
   injecting resin through an injection port into an impregnation space sealed by a bag film to impregnate fibers with the resin;
   sucking the resin through a suction port;
   forming a suction hole different from the suction port in the bag film for a non-impregnation portion;
   attaching a suction tool to the suction hole, the suction tool having a porous portion in which a plurality of holes are formed; and
   sucking the resin through the porous portion from the impregnation space.

2. The composite material manufacturing method of claim 1, further comprising:
   forming an injection hole in the bag film; and
   injecting the resin into the impregnation space through the injection hole during said sucking the resin through the suction hole.

3. The composite material manufacturing method of claim 2, wherein the resin is sucked through the suction hole and the resin is injected into the impregnation space through the injection hole while the resin is sucked through the suction port and the resin is injected into the impregnation space through the injection port.

4. The composite material manufacturing method of claim 3, further comprising:
   detecting a position of the non-impregnation portion in the impregnation space.

5. The composite material manufacturing method of claim 4, further comprising closing a hole formed in the bag film at a position corresponding to the position of the non-impregnation portion,
   wherein said sucking the resin through the porous portion is performed after said hole is closed.

6. The composite material manufacturing method of claim 1, further comprising:
   sealing the impregnation space by covering an opening formed in the bag film with another bag film.

7. The composite material manufacturing method of claim 1, wherein the suction tool has a passage for conveying resin, and the porous portion extends across an entire cross section of the passage.

8. A composite material manufacturing method comprising:
   injecting resin through an injection port into an impregnation space sealed by a bag film to impregnate fibers with the resin;
   sucking the resin through a suction port;
   forming a suction hole different from the suction port in the bag film adjacent to a non-impregnation portion of the fibers, the non-impregnation portion being a portion of the fibers having a failure of resin impregnation;
   attaching a suction tool to the suction hole, the suction tool having a porous portion in which a plurality of holes are formed;
   sucking the resin through the porous portion from the impregnation space; and
   during said sucking the resin through the porous portion, impregnating the non-impregnation portion with the resin.

9. The composite material manufacturing method of claim 7, further comprising:
   forming an injection hole in the bag film; and
   injecting the resin into the impregnation space through the injection hole during said sucking the resin through the suction hole.

10. The composite material manufacturing method of claim 8, wherein the resin is sucked through the suction hole and the resin is injected into the impregnation space through the injection hole while the resin is sucked through the suction port and the resin is injected into the impregnation space through the injection port.

11. The composite material manufacturing method of claim 9, further comprising:
   detecting a position of the non-impregnation portion in the impregnation space.

12. The composite material manufacturing method of claim 10, further comprising closing a hole formed in the bag film at a position corresponding to the position of the non-impregnation portion,
   wherein said sucking the resin through the porous portion is performed after said hole is closed.

13. The composite material manufacturing method of claim 7, further comprising:
   sealing the impregnation space by covering an opening formed in the bag film with another bag film.

14. The composite material manufacturing method of claim 7, wherein the suction tool has a passage for conveying resin, and the porous portion extends across an entire cross section of the passage.

\* \* \* \* \*